United States Patent
Gao et al.

(10) Patent No.: US 9,043,275 B2
(45) Date of Patent: May 26, 2015

(54) DATA SYNCHRONIZATION USING STRING MATCHING

(75) Inventors: Ying M. Gao, Beijing (CN); Jia Huo, Beijing (CN); Hong Xiao, Beijing (CN); Yuan L. Yang, Beijing (CN); Kai Zhang, Beijing (CN); Xian Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 13/471,296

(22) Filed: May 14, 2012

(65) Prior Publication Data

US 2013/0054522 A1 Feb. 28, 2013

(30) Foreign Application Priority Data

Aug. 30, 2011 (CN) .......................... 2011 1 0252194

(51) Int. Cl.
*G06F 17/30* (2006.01)
(52) U.S. Cl.
CPC ............................... *G06F 17/30575* (2013.01)
(58) Field of Classification Search
CPC .................................................. G06F 17/30575
USPC ........................................ 707/620, 610, 691
See application file for complete search history.

(56) References Cited

U.S. PATENT DOCUMENTS

| | | | |
|---|---|---|---|
| 5,832,520 A | | 11/1998 | Miller |
| 6,453,396 B1 * | | 9/2002 | Boone et al. .................. 711/162 |
| 6,636,872 B1 | | 10/2003 | Heath et al. |
| 7,313,577 B2 | | 12/2007 | Peng |
| 7,366,824 B2 | | 4/2008 | Chiang |
| 7,509,635 B2 | | 3/2009 | Woodhouse |
| 7,860,834 B2 | | 12/2010 | Meller et al. |
| 7,870,226 B2 | | 1/2011 | Anna et al. |
| 8,315,976 B2 * | | 11/2012 | Multer et al. .................. 707/610 |

(Continued)

FOREIGN PATENT DOCUMENTS

CN 101387976 A 3/2009
JP 5314073 11/2012

(Continued)

OTHER PUBLICATIONS

Prasad J.C & K.S.M. Panicker, String Searching Algorithm Implementation—Performance Study with Two Cluster Configuration, International Journal of Computer Science & Communication, vol. 1, No. 2, Jul.-Dec. 2010, pp. 271-275.

A. Tridgell and P. Mackerras, The rsync algorithm, Technical Report TR-CS-96-05, Jun. 1996. http://cs.anu.edu.au/techreports/1996!index.html.

*Primary Examiner* — Jacob F Bétit
*Assistant Examiner* — Robert Adams
(74) *Attorney, Agent, or Firm* — Sughrue Mion, PLLC (57) ABSTRACT

The present invention relates to the technical field of data or file synchronization. In particular, the present invention relates to a method and system for data synchronization using character string matching. Provided are a method, computer program product, and system for data synchronization between a source node and target node. An old copy and a new copy of data to be synchronized is received. A block map is generated according to the difference determined using character string matching between the old copy and the new copy. The block map, which includes the position information of unchanged blocks and the position information and contents of changed blocks, is transmitted to a target node.

17 Claims, 7 Drawing Sheets

(56) References Cited

U.S. PATENT DOCUMENTS

2005/0234997 A1* 10/2005 Gu et al. ............... 707/104.1
2006/0106888 A1 5/2006 Iida et al.
2012/0197844 A1* 8/2012 Wang et al. ............. 707/646

FOREIGN PATENT DOCUMENTS

| WO | WO 03096211 | 11/2003 |
| WO | WO 2009132261 | 10/2009 |

* cited by examiner

DATA SYNCHRONIZATION USING STRING MATCHING

TECHNICAL FIELD OF THE INVENTION

The present invention relates to the technical field of data or file synchronization, and particularly, the present invention relates to a method and system for data synchronization using a character string matching algorithm.

BACKGROUND OF THE INVENTION

Today, applications increasingly store data or files on multiple computers. To guarantee data or file consistency, updates made on one computer must be synchronized in other computers. Typically, the original computer or computing node on which the data update occurs is called a source node, and the other computers or computing nodes to be synchronized are called the target nodes. A consistency guarantee is especially important where data may be redundantly stored in multiple nodes (e.g. cloud environment).

There are some solutions in the prior art to solve the data synchronization problem. According to one solution in the prior art, when a file in an original node is updated, the updated file is transmitted as a whole to other remote or local target nodes that need to synchronize the file. An obvious disadvantage of this solution is that small updates (even one byte updates) require the whole file to be transmitted, thus causing large and unnecessary consumption of time and network resources.

According to another solution in the prior art, on old copy of data or a file is divided into data blocks of a fixed size, and when the data or file is updated in an original node, a hash algorithm is used to identify these data blocks in a new copy of the data or file, and then the position information of the data blocks in the updated file and the contents of the updated data blocks are sent to a target node to perform data synchronization. This solution is not optimal because CPU resources are used for the hash computation, and excessive network resources are used in the transmission of the content and data blocks position information.

Therefore, a technique is needed for data synchronization between a source node and a target node by computing the difference between the new and old data or a file to avoid transmitting the whole contents of the file.

SUMMARY OF THE INVENTION

Provided are a method, computer program product, and system for data synchronization between a source node and target node. An old copy and a new copy of data to be synchronized is received. A block map is generated according to the difference determined using character string matching between the old copy and the new copy. The block map, which includes the position information of unchanged blocks and the position information and contents of changed blocks, is transmitted to a target node.

BRIEF DESCRIPTION OF THE ACCOMPANYING DRAWINGS

The above and other features of the present invention will become more apparent through detailed description of embodiments presented in conjunction with the accompanying drawings, in which, the same reference numerals denote the same or similar parts, and in which.

DETAILED DESCRIPTION OF SPECIFIC EMBODIMENTS OF THE INVENTION

In the following, the method and system for data synchronization provided by the present invention will be described in detail through embodiments thereof with reference to the drawings.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
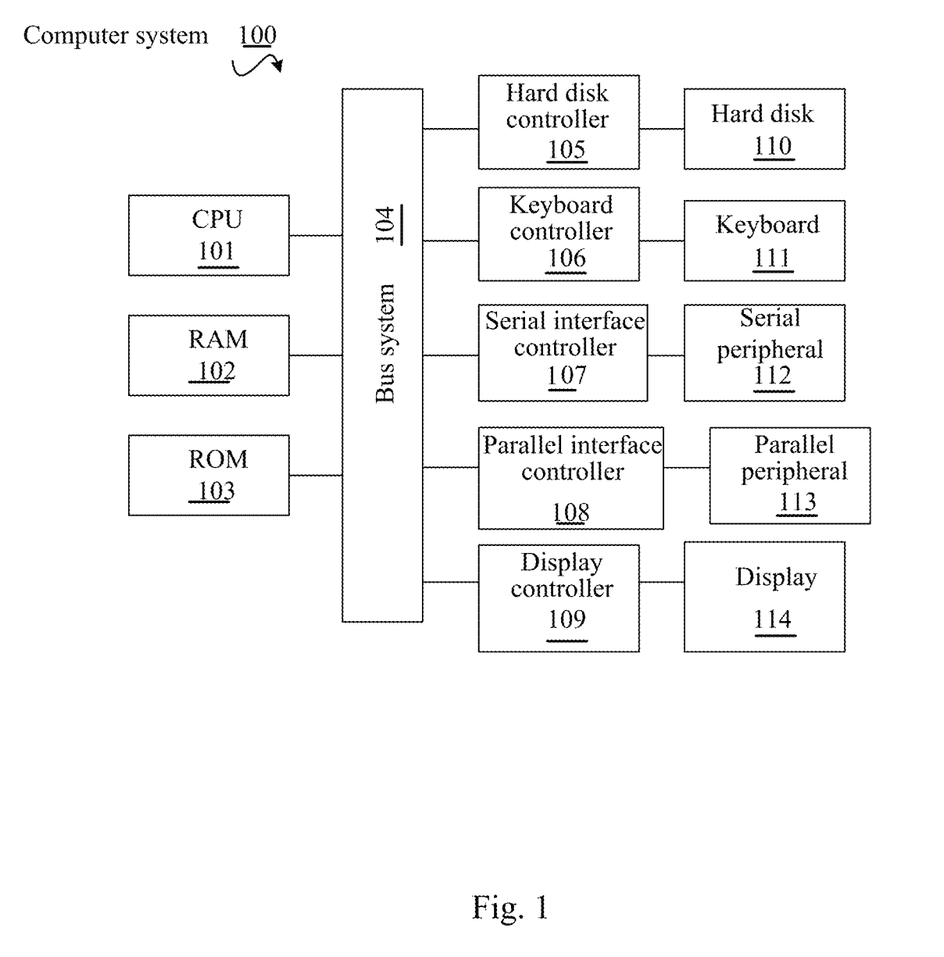
FIG. 1 illustrates a block diagram of an exemplary computing system 100 suitable for realizing embodiments of the present invention.

FIG. 1 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Disk Controller 105, Keyboard Controller 106, Serial Interface Controller 107, Parallel Interface Controller 108, Display Controller 109, Hard Disk 110, Keyboard 111, Serial Peripheral Equipment 112, Parallel Peripheral Equipment 113 and Display 114. Among above devices, CPU 101, RAM 102, ROM 103, Hard Disk Controller 105, Keyboard Controller 106, Serial Interface Controller 107, Parallel Interface Controller 108 and Display Controller 109 are coupled to the System Bus 104. Hard Disk 110 is coupled to Hard Disk Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

Figure 2:
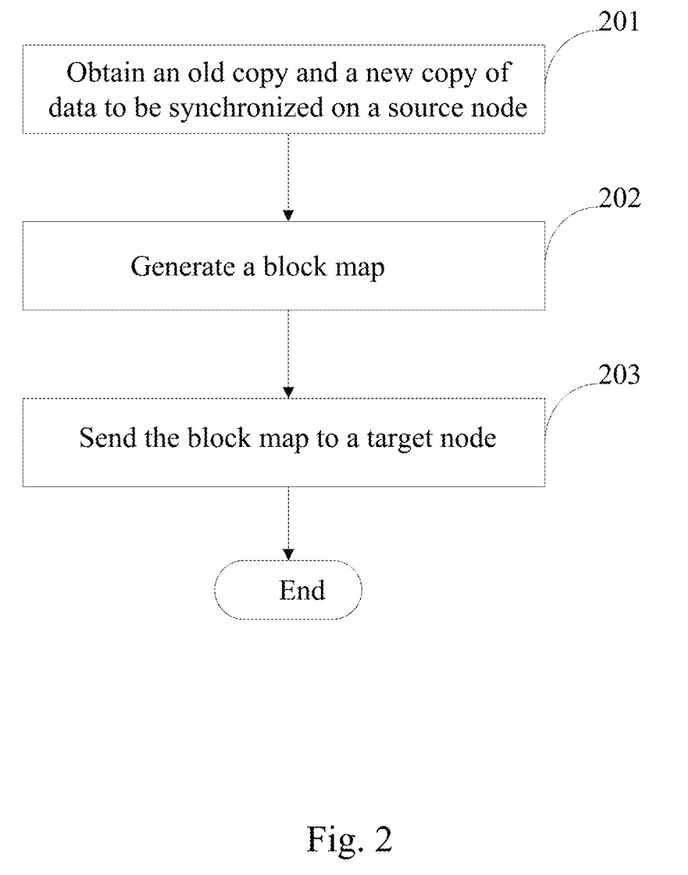
FIG. 2 illustrates a flow diagram of a method for data synchronization according to an embodiment of the present invention.

FIG. 2 illustrates a flow diagram of a method for data synchronization according to an embodiment of the present invention. The method shown in FIG. 2 starts at step 201, in which an old copy and a new copy of data to be synchronized on a source node are obtained. A source node refers to the original computer or the original computing node where update to the data or file occurs. As the name implies, an old copy refers to the data before updating, and a new copy refers to the data after updating. According to step 201, an old copy and a new copy of the data to be synchronized can both be obtained from the source node. This is different from the conventional data synchronization operations among multiple nodes, using a hash algorithm, where an old copy of the data to be synchronized is not needed on the source node. From the following description, it will be clear that character string matching requires the old and new copy on the source node.

Next, the method shown in FIG. 2 proceeds to step 202, where the difference between the old copy and new copy is determined using character string matching to generate a block map. "Character string matching" refers a string search algorithm. According to an embodiment of the present invention, the string search algorithm is an algorithm for finding the position of a given pattern string present in a larger string. An algorithm of this kind is generally used for character string searching, but most string search algorithms are not limited as to the format of the string (except character string search algorithms based on a dictionary), and can be used for any string consisting of a number of bytes, including character strings and binary strings. Common string search algorithms include but are not limited to the naïve string search algorithm, the KMP (Knuth-Morris-Pratt) algorithm, the BM algorithm (Boyer-Moore string search algorithm), etc. Those skilled in the art will understand that the specific contents of the above string search algorithms belong to common knowledge of the field, and can be found in relevant disclosed documents, thus are not described here. Meanwhile, it needs to be emphasized that the present invention is not limited to a specific string search algorithm, and any algorithm enabling matching determination between character strings are suitable for the present invention.

Since the old copy and the new copy of the data to be synchronized are obtained in step 201, the difference between the old copy and the new copy can be determined using character string matching, and the block map can be generated according to the determined difference in step 202. According to an embodiment of the present invention, the generated block map includes the position information of unchanged blocks and the position information and contents of changed blocks. The key point of the block map lies in providing relevant information without limiting the specific manner of providing or presenting the information; and the block map is to be read by a computer, rather than presented to a user. Accordingly, the specific example of generating the block map described below (especially in FIG. 4) is only for illustrating the process of the computation. Blocks in the generated block map are generated in real time during character string matching and are of variable length, unlike data blocks of a fixed size to which a file to be synchronized is divided in advance in data synchronization using a hash algorithm.

Next, in step 203, the block map generated is sent to a target node, in order to synchronize an old copy of the data to be synchronized on the target node to a new copy. Since the block map include the position information of the unchanged blocks and the position information and contents of the changed blocks, the block map can be used by the target node to realize data synchronization.

Using the method provided in FIG. 2, by means of character string matching, the difference between new and old data can be identified so as to realize data synchronization between a target node and a source node, and during data synchronization, only necessary contents need to be transmitted and no hash algorithm needs to be used.

Figure 3:
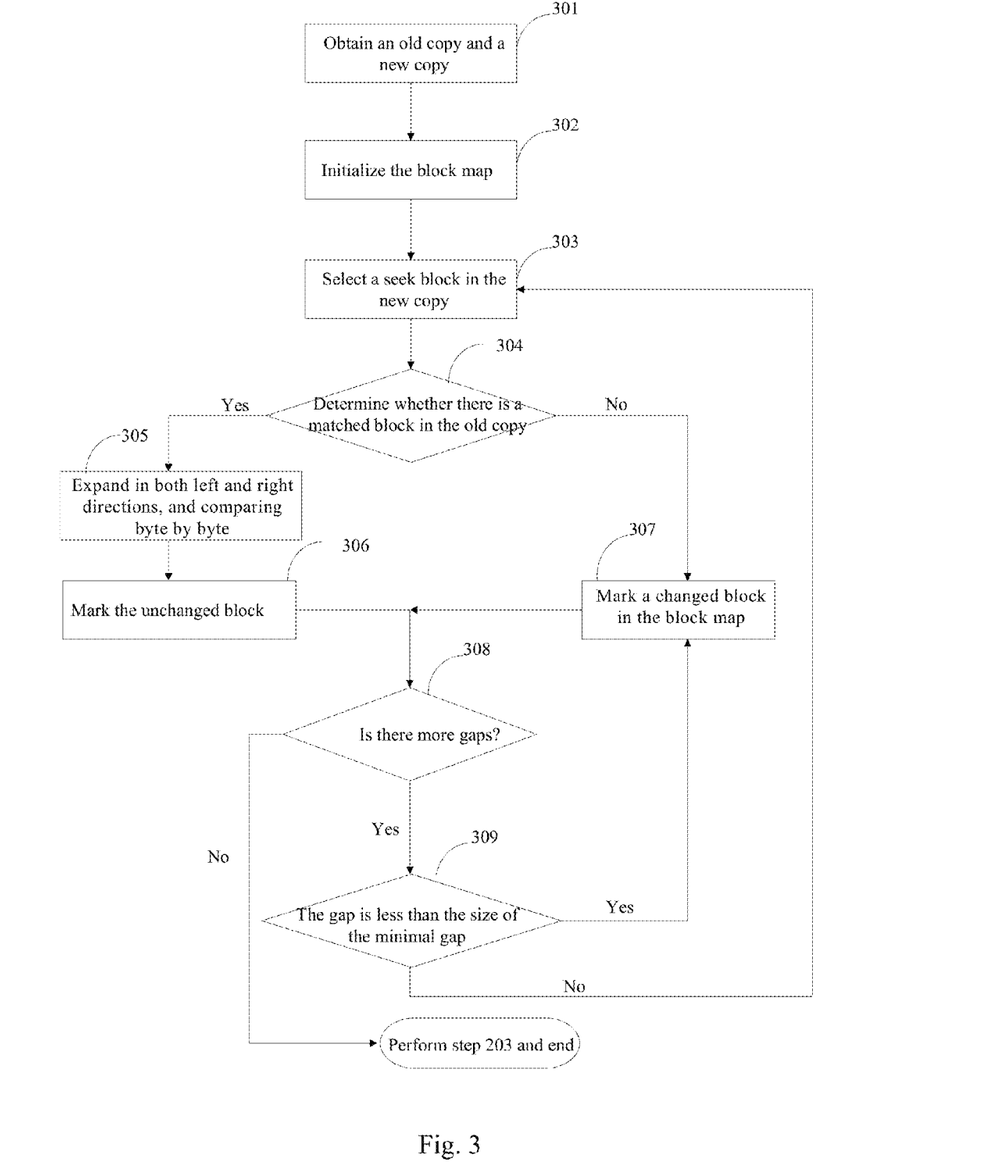
FIG. 3 illustrates a flow diagram of a method for data synchronization according to another embodiment of the present invention.

FIG. 3 illustrates a flow diagram of a method for data synchronization according to another embodiment of the present invention. The method shown in FIG. 3 starts at step 301, which corresponds to 201 in FIG. 2 and will not be described here. In step 302, the block map is initialized as a gap of the same length as the new copy. A gap refers to an area that is still in an unknown state in the block map since no character string matching between new and old copies has been performed thereon.

Next, the method shown in FIG. 3 proceeds to step 303, in which, a seek block of a predefined length is selected from the portion of the new copy corresponding to the gap. The seek block is a small chunk of data taken from the new file, and is used for searching for the same data in the old file. The length of the seek block will affect the search efficiency, and should be selected based on the specific string search algorithm adopted in the implementation. In general, a length from 512 bytes to 2048 bytes (not limited thereto) is suitable. According to an embodiment of the present invention, a seek block of a predefined length is selected in the middle of the gap. According to another embodiment of the present invention, a seek block of a predefined length is selected at a position other than the middle of the gap. According to an embodiment of the present invention, if the block map has multiple gaps during its generation, a relatively larger (with a greater length) gap is processed first. According to another embodiment of the present invention, if the block map has multiple gaps during its generation, randomly any gap is processed first. Those skilled in the art will recognize that while starting processing from a larger gap, and selecting a seek block in the middle of a gap may be conducive to enhancing the search efficiency, the processing order of priority multiple gaps and method of selecting the position of the seek block for a specific gap will not affect the realization of the technical effects and objects of the present invention; all are within the scope of the present invention.

The method shown in FIG. 3 proceeds to step 304, in which by using character string matching, it is determined whether the old copy has a block corresponding to the seek block. Whatever character string matching method (string search algorithm) is selected, it can be used to determine whether the old copy has a block corresponding to the seek block selected in the new copy. Then, the block map can be updated according to the determination result in step 304.

Specifically, in response to the determination result in step 304 being no, indicating that in the old copy on the source node, no block has be found identical to the seek block selected in the new copy, the method proceeds to step 307 to mark the corresponding position in the block map as a changed block. The "corresponding position" stated here refers to the position (area) in the block map corresponding to the seek block selected in the new copy.

In response to the determination result in step 304 being yes, indicating that in the old copy on the source node a block has been found identical to the seek block selected in the new copy, the method proceeds to step 305 to expand the seek block in the new copy and in the old copy in both left and right directions, and compare byte by byte to determine the left and right boundaries of the unchanged block. Then in step 306, the unchanged block with the determined boundaries is marked in the block map. Generally, if an identical block is found in the old copy, an area of the same size as the seek block in the block map may be marked as an unchanged block. However, in order to enhance the matching efficiency, the present invention proposes inventively the method of comparing byte by byte by expanding to the left and to the right, thus determining the unchanged block with the broadest scope as far as possible in one shot.

Next, whatever the determination result in step 304 is and whatever corresponding operation is performed, after performing steps 306 and 307, the method proceeds to step 308, in which, it is determined whether the block map has more gaps (unknown blocks). In response to the determination result being no, indicating that all the gaps in the block map have been processed, the block map only including the marks of changed blocks and unchanged blocks, generation of the block map is finished, and the method shown in FIG. 3 "performs step 203 and ends", in which step 203, the generated block map is sent to the target node to synchronize an old copy of the data to be synchronized on the target node to a new copy.

In response the determination result in step 308 being yes, the method proceeds to step 309, in which it is determined whether the gap is less than the size of the minimal gap of a predefined length. The size of the minimal gap is the lower limit of the length of a gap. Preferably, when the length of a gap is less that the size of the minimal gap, the gap will no longer be used for searching, rather it will be directly marked as an changed block in the block map. The purpose of predefining the minimal gap is to achieve a balance between the resources consumed by searching and the resources consumed by transmission. If a block is very small, the resources consumed by transmitting it directly being close to or less than the resources consumed by using it for searching, it may be marked as a changed block directly and its data may be sent directly. The length definition of the minimal gap depends on the network transmission rate and the computer performance. For a faster network transmission rate, a larger size of the minimal gap should be selected, and for a higher computer performance, a smaller size of the minimal gap should be selected.

As described above, in response to the determination result in step 309 being yes, the method proceeds to step 307, in which the corresponding position in the block map is marked as a changed block. Then the determination in steps 308 and 309 is repeated, until the determination result in step 308 is no. In response to the determination result in step 309 being no, indicating that an existing gap is greater than or equal to the size of the predefined minimal gap, the gap still needs to be processed, thus the method proceeds to step 303, and the operations from step 303 through step 309 are repeated, until the determination result in step 308 is no.

It needs to be noted that step 309 is not a necessary step of the present invention. Those skilled in the art will recognize that the operations from step 301 through step 308 can well be performed on all the gaps (however small the length of a gap is), until all the gaps have been processed.

As seen from the method shown in FIG. 3, by initializing the block map, and performing character string matching processing on the gaps in the block map until all the gaps in the block map have been eliminated, the difference between the new and old data can be identified so as to realize data synchronization between the target node and the source node, and in the data synchronization, only necessary contents need to be transmitted and no hash algorithm needs to be used, and in the case of finding a matched seek block, the maximum unchanged block may be found as far as possible by expanding to the left and to the right, thus enhancing the data synchronization efficiency and saving the computation resources.

FIG. 4A-4G are schematic diagrams illustrating the phases of the process of generating a block map according to an embodiment of the present invention. In the example shown in FIG. 4, in each cycle, the largest gap is found in the block map, and the middle position of the gap is used as the position to select a seek block.

Figure 4A:
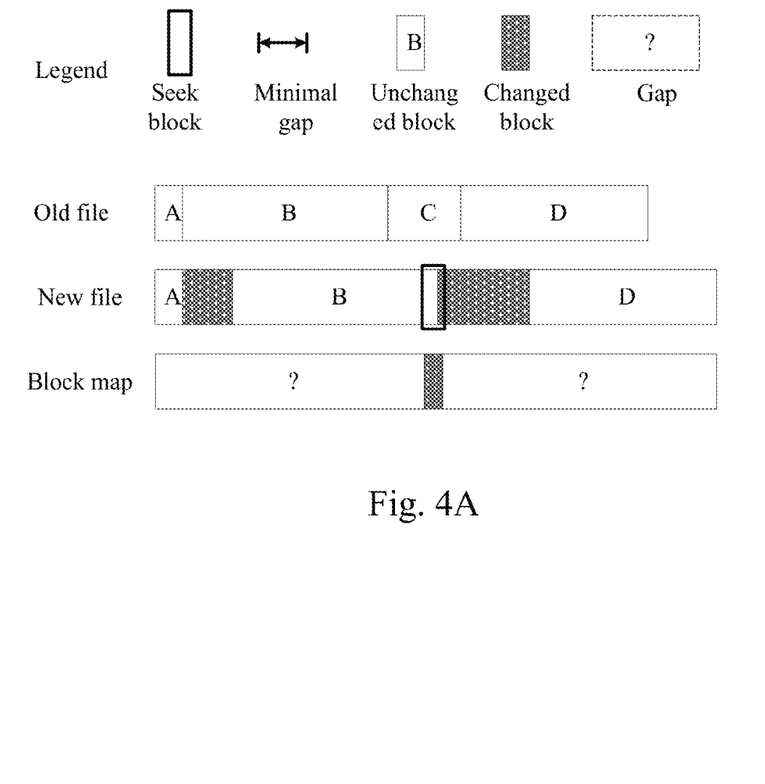
FIG. 4A-4G is a schematic diagram illustrating the phases of the process of generating a block map and synchronizing data on a target node according to an embodiment of the present invention.

FIG. 4A illustrates the legend and a schematic diagram of the operations in the first cycle. In the first cycle, the entire block map is a complete gap. Searching starts from the middle of the gap. A seek block is taken from a corresponding position in the new file, and a string search algorithm is used to search on the old file. The search does not find a corresponding block, thus the middle of the block map is marked as a changed block.

Figure 4B:
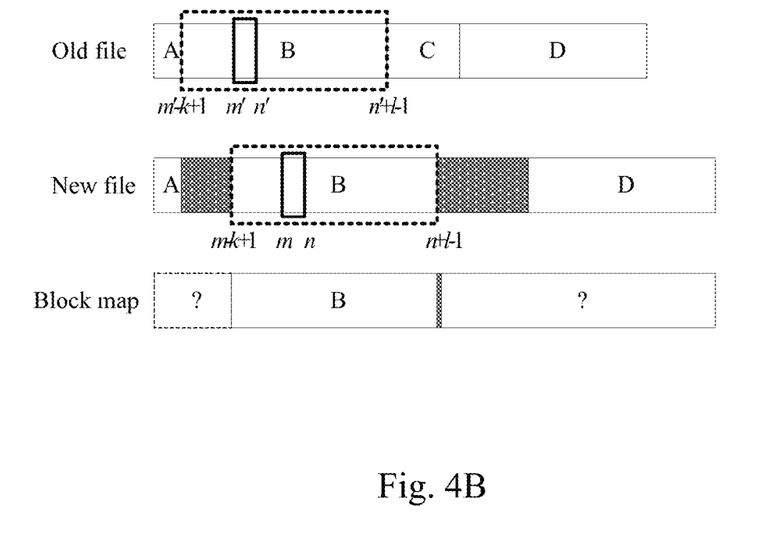

FIG. 4B illustrates a schematic diagram of the operations in the second cycle. At the end of the first cycle, two gaps of the same size at the left and right are formed in the block map. A seek block is selected in the middle of the left gap, and the seek block is taken from the corresponding position of the new file. The search algorithm finds a corresponding block in the old file. The seek block is expanded to the left and to the right in both the old and new files to compare byte by byte, in order to find the left and right boundaries of the unchanged block area. For example, assuming the left boundary of the seek block in the new file is m, which corresponds to m' in the old file, by moving to the left, the $(m-1)^{th}$ byte in the new file and the $(m'-1)^{th}$ byte in the old file is compared; if they are identical, the $(m-2)^{th}$ byte in the new file and the $(m'-2)^{th}$ byte in the old file is next compared. The process is repeated, until it is found that the $(m-k)^{th}$ (where k>=1) byte in the new file is different from the $(m'-k)^{th}$ byte in the old file. Thus, the left boundary of the unchanged block is the $(m-k+1)^{th}$ byte in the new file, which corresponds to the $(m-k+1)^{th}$ byte in the old file. Likewise, assuming the right boundary of the seek block in the new file is n, which corresponds to n' in the old file, by using the same method to move from the right boundary of the seek block to the right, the first byte in the new file that is different from that in the old file can be found to be the $(n+l)^{th}$ (where l>=1) byte in the new file, which corresponds to the $(n'+l)^{th}$ byte in the old file. Thus, the right boundary of the unchanged block in the new file is n+l−1, which corresponds to n'+l−1 in the old file. Then, the area from the $(m-k+1)^{th}$ byte to the $(n+l-1)^{th}$ byte in the block map is marked as an unchanged block, the data of which is completely the same as that from the $(m'-k+1)^{th}$ byte to the $(n'+l-1)^{th}$ byte in the old file. The marked position in the block map is the corresponding position in the new file of block B in the old file.

Figure 4C:
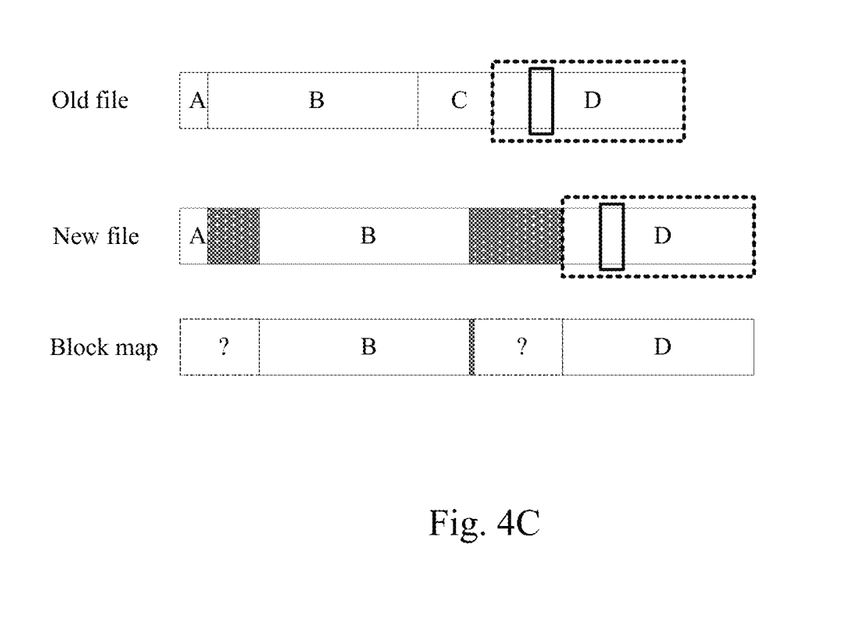

FIG. 4C illustrates a schematic diagram of the operations of the third cycle. At the end of the second cycle, in the block map are formed two gaps. The middle of the biggest gap is selected for searching, and from the corresponding position in the new file a seek block is taken. The string search algorithm finds a corresponding block in the old file. The same method as in FIG. 2 is used to expand the seek block to the left and to the right to the boundaries of the unchanged block, then the corresponding position in the new file of the block D in the old file is marked in the block map.

Figure 4D:
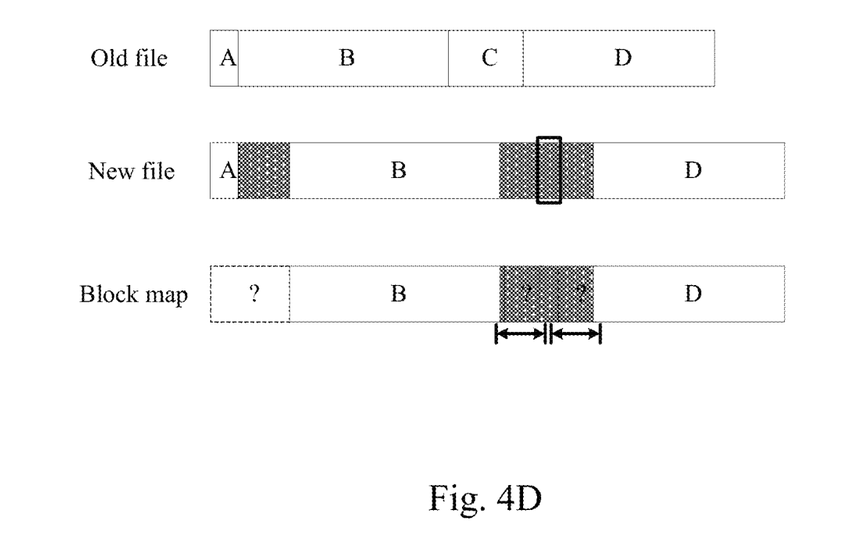

FIG. 4D illustrates a schematic diagram of the operations of the forth cycle. In the operations of the forth cycle, the middle of the biggest gap is selected to start searching. The string search algorithm does not find a corresponding seek block in the old file, thus the seek block is marked as a changed block in the block map. In the meantime, it is found that the unsearched blocks to the left and right of the newly marked block are both less than the minimal gap, thus the left and right two small gaps are directly marked as changed blocks, and no more searching is tried on them.

Figure 4E:
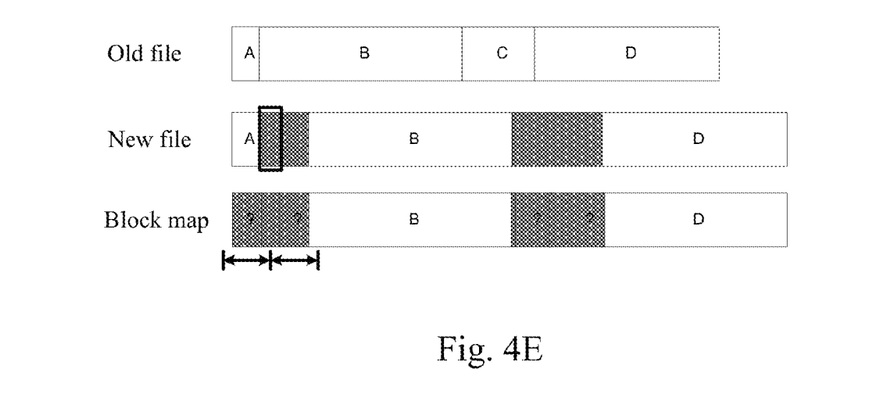

FIG. 4E illustrates a schematic diagram of the operations of the fifth cycle. The middle of the last gap in the block map is selected to start searching. The string search algorithm does not find a corresponding seek block in the old file, thus the seek block is marked as a changed block in the block map. In the meantime, it is found that the unsearched blocks to the left and right of the newly marked block are both less than the minimal gap, thus the two small gaps to the left and right are marked directly as changed blocks, and no more searching is tried on them. It can be seen that block A is actually an unchanged block, it is marked as a changed block, however. This is because that block A is too small that the cost of transmission of it is negligible compared to the cost of searching on it.

Figure 4F:
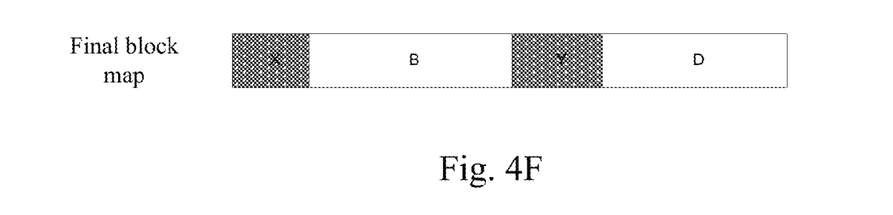

FIG. 4F illustrates a schematic diagram of the finally generated block map. In the finally generated block map, for the unchanged blocks B and D, their positions in the new and old copies will be transmitted to the remote computer (i.e., target node). For the changed blocks X and Y, their positions in the new copy and their contents will be transmitted to the remote computer.

Figure 4G:
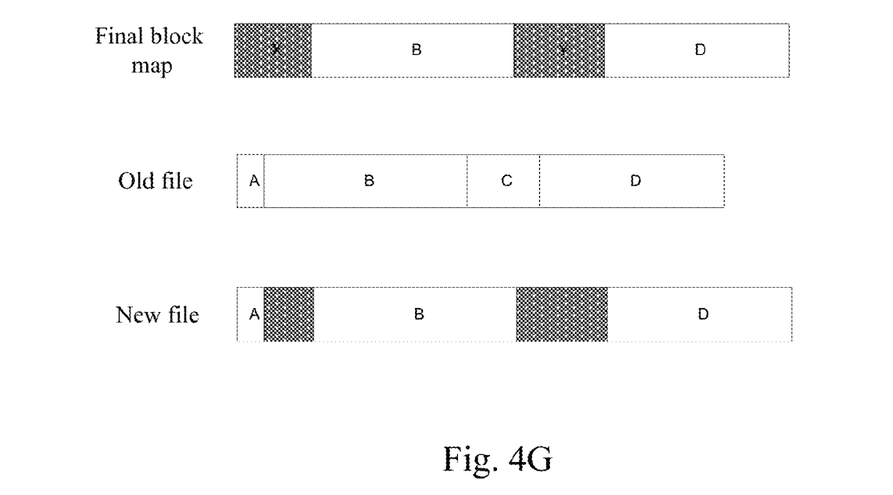

FIG. 4G illustrates a schematic diagram of data synchronization using the generated block map on the target node. Using the position information of the unchanged blocks B and C in the block map and the position and contents information of the changed blocks X and Y, the block map and the old copy on the target node can be combined to generate the new copy, thus completing the data synchronization.

Figure 5:
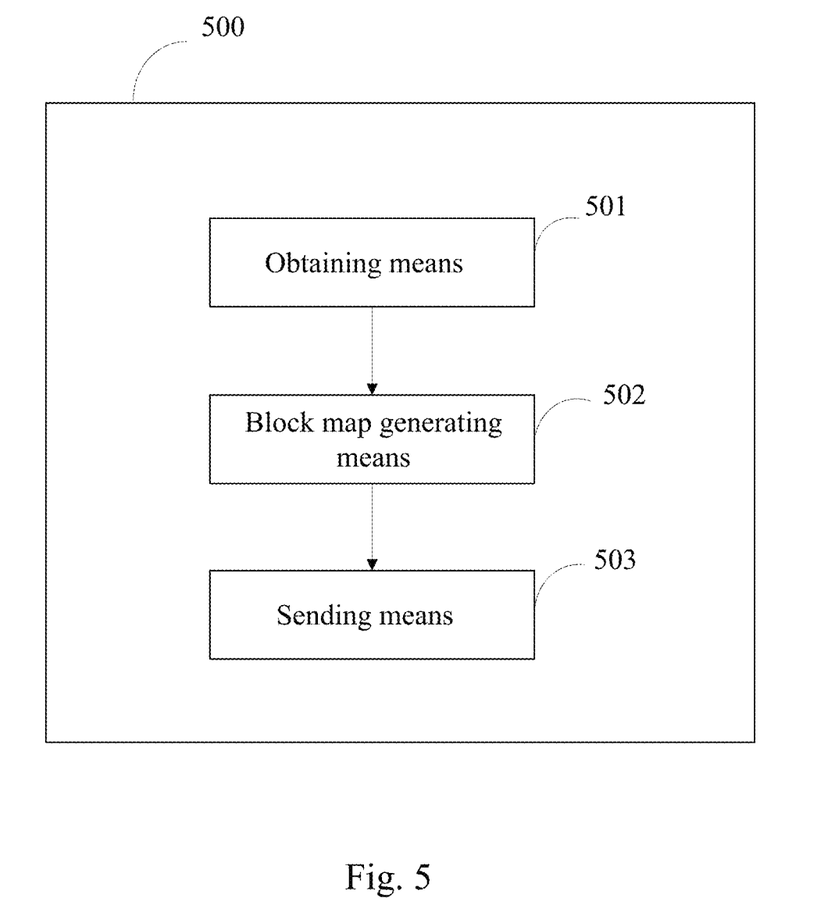
FIG. 5 illustrates a block diagram of a system for data synchronization according to an embodiment of the present invention.

FIG. 5 illustrates a block diagram of a system for data synchronization according to an embodiment of the present invention. The system shown in FIG. 5 is denoted as a whole by 500. Specifically, the system 500 comprises obtaining means 501 configured to obtain an old copy and a new copy of data to be synchronized on a source node; block map generating means 502 configured to determine the difference between the old copy and the new copy using character string matching to generate a block map; and sending means 503 configured to send the generated block map to a target node to synchronize an old copy of the data to be synchronized on the target node to a new copy. Those skilled in the art will understand that the means 501-503 in the system 500 correspond to the steps 201-203 in the method shown in FIG. 2 respectively, and they are not described in detail here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the system and method for using a remote application to process a local file are described in detail above in conjunction with specific embodiments, the present invention is not limited thereto. Those skilled in the art, in view of the above teaching, can make various changes, substitution and transformation to the present invention without departing from the spirit and scope of the present disclosure. It is to be understood that all these changes, substitution and transformation are still within the scope of protection of the present invention, which is defined by the appended claims.

The invention claimed is:

1. A computer implemented method comprising:
   receiving an old copy of data and a new copy of data to be synchronized, wherein both the old copy of data and the new copy of data are from a source node on which update to the old copy of data occurs;
   generating a block map according to the difference determined using character string matching between the old copy of data and the new copy of data, the block map including position information of unchanged blocks and position information and contents of changed blocks; and
   transmitting the block map to a target node, on which the block map is combined with an old copy of data of the target node to complete the data synchronization, wherein the new copy of data of the source node is an updated version of the old copy of data of the source node; and
   wherein the generating the block map comprises:
     determining whether a gap in the block map is less than a minimal gap of a predefined length;
     when the gap in the block map is less than a minimal gap of a predefined length, marking the gap in the block map directly as a changed block and stopping further processing for character string matching on the gap in the block map.

2. The method of claim 1, wherein the generating the block map further comprises:
   initializing the block map as a gap of the same length as the new copy of data;
   selecting a seek block of a predefined length from a portion of the new copy of data corresponding to the gap;
   determining whether the old copy of data has a block corresponding to the seek block by using character string matching; and
   updating the block map based on the determination result.

3. The method of claim 2, wherein the updating the block map further comprises:
   responsive to the determination result being no, marking a corresponding position in the block map as a changed block.

4. The method of claim 2, wherein the updating the block map further comprises:
   responsive to the determination result being yes, expanding the seek block in the new copy of data and the old copy of data to the left and to the right, and comparing byte by byte to determine left and right boundaries of an unchanged block; and
   marking the determined unchanged block with the left and right boundaries in the block map.

5. The method of claim 1, wherein one or more blocks in the block map are of variable lengths.

6. A system comprising:
   a processor; and
   a memory containing program code, which when executed by the processor is configured to perform an operation, comprising:
   receiving an old copy of data and a new copy of data to be synchronized, wherein both the old copy of data and the new copy of data are from a source node on which update to the old copy of data occurs;
   generating a block map according to the difference determined using character string matching between the old copy of data and the new copy of data, the block map including position information of unchanged blocks and position information and contents of changed blocks; and
   transmitting the block map to a target node, on which the block map is combined with an old copy of data of the target node to complete the data synchronization, wherein the new copy of data of the source node is an updated version of the old copy of data of the source node, and
   wherein the generating the block map comprises:
     determining whether a gap in the block map is less than a minimal gap of a predefined length;
     when the gap in the block map is less than a minimal gap of a predefined length, marking the gap in the block map directly as a changed block and and stopping further processing for character string matching on the gap in the block map.

7. The system of claim 6, wherein the generating the block map further comprises:
   initializing the block map as a gap of the same length as the new copy of data;
   selecting a seek block of a predefined length from a portion of the new copy of data corresponding to the gap;
   determining whether the old copy of data has a block corresponding to the seek block by using character string matching; and
   updating the block map based on the determination result.

8. The system of claim 7, wherein the updating the block map further comprises:
   responsive to the determination result being no, marking a corresponding position in the block map as a changed block.

9. The system of claim 7, wherein the updating the block map further comprises:
   responsive to the determination result being yes, expanding the seek block in the new copy of data and the old copy of data to the left and to the right, and comparing byte by byte to determine left and right boundaries of an unchanged block; and
   marking the determined unchanged block with the left and right boundaries in the block map.

10. The system of claim 6, wherein one or more blocks in the block map are of variable lengths.

11. A computer program product comprising a non-transitory computer readable storage medium storing computer readable program code, which when executed by a computer, causes the computer to:
   receive an old copy of data and a new copy of data to be synchronized, wherein both the old copy of data and the new copy of data are from a source node on which update to the old copy of data occurs;

generate a block map according to the difference determined using character string matching between the old copy of data and the new copy of data wherein the block map includes position information of unchanged blocks and position information and contents of changed blocks; and transmit the block map to a target node on which the block map is combined with an old copy of data of the target node to complete the data synchronization, wherein the new copy of data of the source node is an updated version of the old copy of data of the source node, and wherein the generating the block map comprises:
- determining whether a gap in the block map is less than a minimal gap of a predefined length;
- when the gap in the block map is less than a minimal gap of a predefined length, marking the gap in the block map directly as a changed block and and stopping further processing for character string matching on the gap in the block map.

12. The computer program product of claim 11, wherein the operation of the computer to generate the block map further causes the computer to:
- initialize the block map as a gap of the same length as the new copy of data;
- select a seek block of a predefined length from a portion of the new copy of data corresponding to the gap;
- determine whether the old copy of data has a block corresponding to the seek block by using character string matching; and
- update the block map based on the determination result.

13. The computer program product of claim 12, wherein the operation of the computer to update the block map further causes the computer to:
- respond to the determination result being no by marking a corresponding position in the block map as a changed block.

14. The computer program product of claim 12, wherein the operation of the computer to update the block map further causes the computer to:
- respond to the determination result being yes by expanding the seek block in the new copy of data and the old copy of data to the left and to the right, and compare byte by byte to determine left and right boundaries of an unchanged block; and
- mark the determined unchanged block with the left and right boundaries in the block map.

15. The computer program product of claim 11, wherein blocks in the block map are of variable lengths.

16. The method of claim 1, wherein the blocks in the block map are generated in real time during the character string matching.

17. The method of claim 1, wherein when the block map has a plurality of gaps during its generation, a gap having largest length is processed first by selecting a seek block of a predefined length in the middle of the gap.

* * * * *